(12) United States Patent
Shi et al.

(10) Patent No.: US 10,444,451 B2
(45) Date of Patent: Oct. 15, 2019

(54) SHIELDED PHOTONIC INTEGRATED CIRCUIT

(71) Applicant: Elenion Technologies, LLC, New York, NY (US)

(72) Inventors: Ruizhi Shi, New York, NY (US); Yang Liu, Elmhurst, NY (US); Ari Novack, New York, NY (US); Yangjin Ma, Brooklyn, NY (US); Kishore Padmaraju, New York, NY (US); Michael J. Hochberg, New York, NY (US)

(73) Assignee: Elenion Technologies, LLC, New York, NY (US)

( * ) Notice: Subject to any disclaimer, the term of this patent is extended or adjusted under 35 U.S.C. 154(b) by 0 days.

(21) Appl. No.: 16/238,692

(22) Filed: Jan. 3, 2019

(65) Prior Publication Data

US 2019/0137709 A1   May 9, 2019

Related U.S. Application Data

(63) Continuation of application No. 15/659,880, filed on Jul. 26, 2017, now Pat. No. 10,209,465, which is a continuation of application No. 14/963,842, filed on Dec. 9, 2015, now Pat. No. 9,739,938.

(51) Int. Cl.
*G02B 6/42* (2006.01)
*G02B 6/12* (2006.01)
*G02B 6/122* (2006.01)

(52) U.S. Cl.
CPC ............ *G02B 6/4277* (2013.01); *G02B 6/122* (2013.01); *G02B 6/12004* (2013.01); *G02B 2006/12107* (2013.01); *G02B 2006/12157* (2013.01)

(58) Field of Classification Search
CPC .............. G02B 6/12004; G02B 6/4277; G02B 2207/121
See application file for complete search history.

(56) References Cited

U.S. PATENT DOCUMENTS

| | | | |
|---|---|---|---|
| 3,969,751 | A | 7/1976 | Drukaroff |
| 5,031,017 | A | 7/1991 | Pemyeszi |
| 6,052,222 | A | 4/2000 | Kitamura |
| 6,297,862 | B1 | 10/2001 | Murade |
| 6,319,740 | B1 | 11/2001 | Heffner |
| 6,385,375 | B1 | 5/2002 | Goto |
| 6,546,171 | B2 | 4/2003 | Fukutorni |

(Continued)

OTHER PUBLICATIONS

Thomas L. Koch; "OFC Tutorial: III-V and Silicon Photonic Integrated Circuit Technologies"; Optical Society of America; University of Arizona College of Optical Sciences; Mar. 2012 (45 pages).

*Primary Examiner* — Daniel Petkovsek
(74) *Attorney, Agent, or Firm* — Stratford Managers Corporation

(57) ABSTRACT

A light shield may be formed in photonic integrated circuit between integrated optical devices of the photonic integrated circuit. The light shield may be built by using materials already present in the photonic integrated circuit, for example the light shield may include metal walls and doped semiconductor regions. Light-emitting or light-sensitive integrated optical devices or modules of a photonic integrated circuit may be constructed with light shields integrally built in.

17 Claims, 11 Drawing Sheets

(56) References Cited

U.S. PATENT DOCUMENTS

| | | |
|---|---|---|
| 6,559,913 B1 | 5/2003 | Sera |
| 6,567,589 B2 | 5/2003 | Sidorin |
| 6,603,782 B2 * | 8/2003 | Nakanishi ............ G02B 6/4201 372/36 |
| 6,663,295 B2 | 12/2003 | Kami |
| 8,310,413 B2 | 11/2012 | Fish |
| 8,369,666 B2 | 2/2013 | Kamei |
| 9,395,491 B2 * | 7/2016 | Fish ....................... G02B 6/136 |
| 9,739,938 B2 | 8/2017 | Shi |
| 10,209,465 B2 * | 2/2019 | Shi .................... G02B 6/12004 |
| 2002/0196398 A1 | 12/2002 | Jones |
| 2015/0219850 A1 | 8/2015 | Fish |

\* cited by examiner

SHIELDED PHOTONIC INTEGRATED CIRCUIT

CROSS-REFERENCE TO RELATED APPLICATIONS

This application is a continuation of U.S. patent application Ser. No. 15/659,880 filed Jul. 26, 2017, now U.S. Pat. No. 10,209,465, which is a continuation of U.S. patent application Ser. No. 14/963,842, filed Dec. 9, 2015, now U.S. Pat. No. 9,739,938, each of which is hereby incorporated by reference herein in its entirety.

TECHNICAL FIELD

The present disclosure relates to optical devices and modules, and in particular to photonic integrated circuits.

BACKGROUND

Photonic integrated circuits include multiple optical components integrated on a common substrate, typically a semiconductor substrate. The optical components may include arrays of elements such as waveguides, splitters, couplers, interferometers, modulators, filters, etc., and may have similar or different optical processing functions. Photonic integrated circuits may be built by bonding together several optical, electro-optical, or optoelectronic chips. Electrical driver chips may also be attached to optoelectronic chips and electrically coupled by solder bumps or wirebonds.

Structurally, photonic integrated circuits resemble electronic integrated circuits, with optical waveguides for conducting optical signals between different optical components. Due to integrated character of optical components and connections, photonic integrated circuits may be suitable for mass production to a similar degree integrated electronic circuits are, potentially allowing significant economy of scale. Silicon-based photonic integrated circuits in particular may benefit from a well-developed material, technological, and knowledge base of silicon-based microelectronics industry.

It may be desirable to reduce size of photonic integrated circuits to fit more circuits on a same semiconductor wafer. To achieve size reduction, individual circuit components need to be more densely packed. There is, however, a limit on how densely the components may be packed. When distances between the components are too small, optical crosstalk may result. The optical crosstalk occurs because light scattered from one component may be coupled to a nearby component, impacting that component's optical performance. Amplifiers, lasers, and photodetectors may be particularly sensitive to optical crosstalk caused by stray light from neighboring components.

One typical example of a light-scattering component is a Mach-Zehnder interferometer of an optical modulator. When light modes in two arms of the Mach-Zehnder interferometer are in counter phase, a Y-junction combiner combining the two arms does not couple light into the output waveguide of the Y-junction combiner. Instead, the light is coupled into a radiative mode, causing the light to scatter throughout the photonic integrated circuit. Another typical example of a light-scattering component is an in-coupler of light. An in-coupler disposed near an edge of a photonic integrated circuit may scatter light escaped the core of an input waveguide due to an optical misalignment, imperfection of the input optical mode, etc. The scattered light may become guided by various layers of the photonic integrated circuit, causing extensive "ringing", i.e. optical crosstalk.

Thus, not only is optical crosstalk a limiting factor of miniaturization of photonic integrated circuits, it may also be a performance-degrading factor, and a significant design constraint. In prior-art photonic integrated circuits, the optical components are spaced apart to reduce the effect of optical crosstalk. This increases the overall dimensions of photonic integrated circuits, raising manufacturing costs.

SUMMARY

In accordance with an aspect of the present disclosure, a light shield structure may be formed between integrated optical devices of a photonic integrated circuit. Preferably, a light shield structure is formed using the very materials used to build the photonic integrated circuit, i.e. the materials already present in the circuit and compatible with the material system of the circuit. Metal layers, metal vias, and doped semiconductor regions may be used to surround light-sensitive and/or light-emitting integrated optical components or modules. Thus, a light shield may be integrally built in.

In accordance with an aspect of the disclosure, there is provided a photonic integrated circuit comprising a substrate, first and second integrated optical devices over the substrate, and a light shield structure between the first and second integrated optical devices. The light shield structure is configured to suppress optical crosstalk between the first and second integrated optical devices. For example, the light shield structure may include an opaque structure for suppressing i.e. absorbing, reflecting, scattering light propagating between the first and second integrated optical devices, such as a light emitting device and a photodetector. In a preferred embodiment, the opaque structure has optical transmission of less than 10%.

In one exemplary embodiment, the opaque structure may include a first opaque wall fully or partially surrounding the first integrated optical device, e.g. on all four sides, or on three sides when the first integrated optical device is disposed near an edge of a photonic integrated circuit. Openings may be provided in the first opaque wall for optical waveguides to extend through the openings. For silicon-based systems, the first opaque wall may include heavily doped silicon, e.g. doped at a carrier concentration of at least $10^{18}$ cm$^{-3}$.

In one embodiment, the opaque structure is not coplanar with the first or second integrated optical devices. The opaque structure may include a metal structure disposed farther away from the substrate than the first integrated optical device, or closer to the substrate. The light shield structure may include a second opaque wall extending from the first opaque wall and surrounding the first integrated optical device. The light shield structure may also include a photonic crystal, a plasmonic structure, a random or semi-random scatterer, etc.

In accordance with another aspect of the disclosure, the light shield structure may include a dielectric layer and a channel or trench extending through the dielectric layer from the first opaque wall and surrounding the first integrated optical device. The channel or trench may be filled e.g. with metal or semiconductor, forming a second opaque wall extending from the first opaque wall. Furthermore, a light-shielding metal or semiconductor layer may be disposed over the first integrated optical device. The light-shielding metal or semiconductor wall may extend to the metal or semiconductor layer, thus providing a nearly complete integrated enclosure for the first integrated optical device. Similar light shielding structures may be provided around the second integrated optical device as well.

BRIEF DESCRIPTION OF THE DRAWINGS

Exemplary embodiments will now be described in conjunction with the drawings, in which.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art.

Figure 1A:
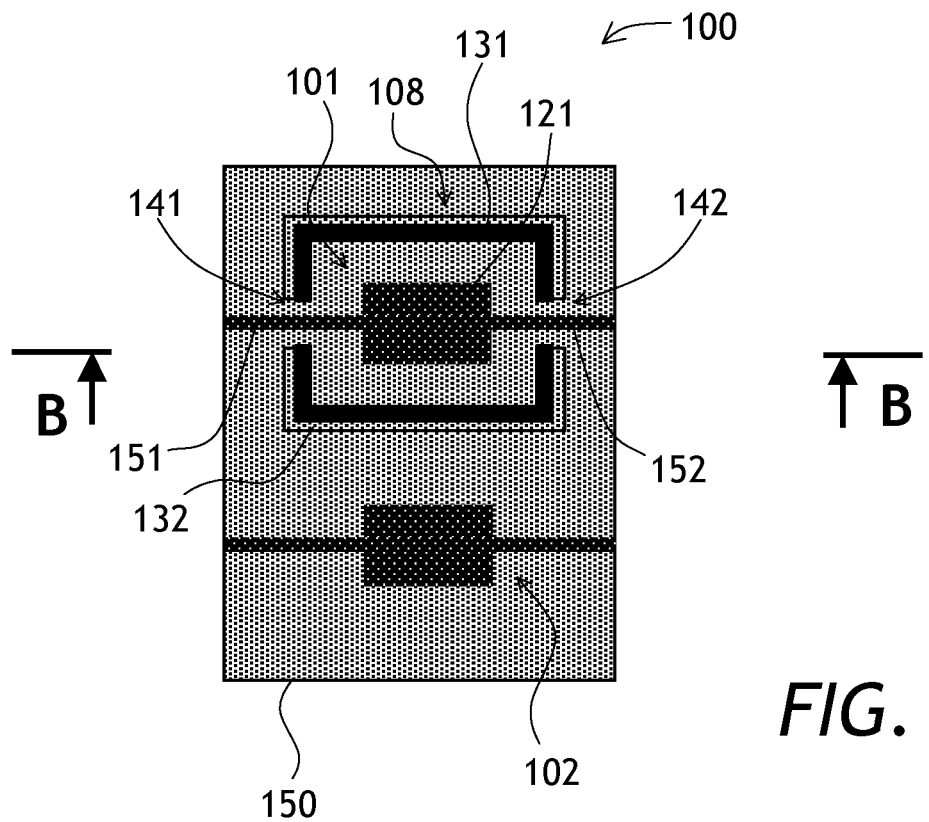
FIG. 1A is a plan view of a photonic integrated circuit of the present disclosure.
Figure 1B:
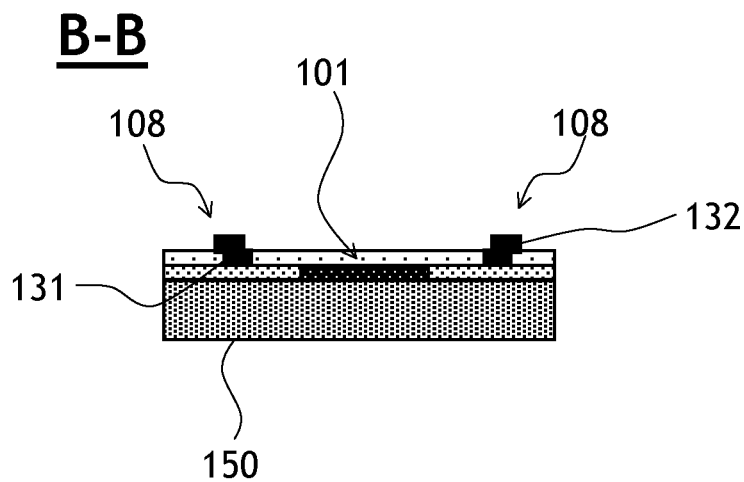
FIG. 1B is a side cross-sectional view of the photonic integrated circuit of FIG. 1A, taken in a plane B-B shown in FIG. 1A.

Referring to FIGS. 1A and 1B, a photonic integrated circuit 100 of the present disclosure includes a substrate 150, first 101 and second 102 integrated optical devices over the substrate 150, and a light shield structure 108 between the first 101 and second 102 integrated optical devices. By way of a non-limiting example, the first integrated optical device 101 may include a slab optical waveguide section 121 coupled to input 151 and output 152 waveguides. The light shield structure 108 may include any opaque structure, e.g. a metal structure, configured to suppress optical crosstalk between the first 101 and second 102 integrated optical devices. In the embodiment shown in FIGS. 1A and 1B, the light shield structure 108 includes a first opaque wall 131 surrounding the first integrated optical device 101. An optional second opaque wall 132 may extend from the first opaque wall 131, surrounding the first integrated optical device 101 as shown in FIG. 1B. In one embodiment, a metal or semiconductor shield layer (not shown for brevity) may extend over the first integrated optical device 101 such that the second opaque wall 132 extends to the metal or semiconductor shield layer.

The first opaque wall 131 and/or second opaque wall 132 may include an optically absorbing material. Furthermore, the first opaque wall 131 and/or second opaque wall 132 may be at least partially reflecting, and/or scattering, to ensure that the first opaque wall 131 effectively functions as a light shield. In one embodiment, the first opaque wall 131 and/or second opaque wall 132 has optical transmission of less than 10%, and more preferably less than 5%, of the incoming and/or outgoing stray light.

Referring specifically to FIG. 1A, the first opaque wall 131 may surround the first integrated optical device 101, while leaving an opening for at least one waveguide, e.g. openings 141, 142 for the input 151 and output 152 waveguides, respectively. The term "surrounds" is understood herein as allowing for openings in a surrounding structure if required, e.g. the openings 141, 142 are provided in the first opaque wall 131 for the input 151 and/or output 152 waveguides.

Referring specifically to FIG. 1B, the light shield structure 108 may be not coplanar with the first integrated optical device. In the embodiment shown, the light shield structure 108 does not extend to the plane of the first integrated optical device, being farther away from the substrate 150 than the first integrated optical device. This may be advantageous in embodiments where the light shield structure 108 includes a metal structure, and the first integrated optical device 101 includes a semiconductor structure under the metal. The light shield structure 108 may also be closer to the substrate 150 than the first integrated optical device 101. The light shield structure 108 may include not only an opaque absorptive structure but also nano- and microstructures such as a photonic crystal, a plasmonic structure, or a random or semi-random scatterer, for example.

In some embodiments of the present disclosure, at least one of the first 101 and/or the second 102 integrated optical device may be manufactured on additional substrates bonded to the substrate 150. Alternatively, at least one of the first 101 and/or the second 102 integrated optical device may be monolithically fabricated on the substrate 150. Furthermore, in some embodiments, the first integrated optical device 101 may include a light emitting device such as a laser or a semiconductor optical amplifier (SOA) e.g. a reflective SOA and/or traveling-wave SOA, while the second integrated optical device 102 may include a receiver, a photodetector, etc.; or the other way around. The first 101 and/or second 102 integrated optical devices may be comprised of Si, $SiO_2$, doped glass, SiON, SiN, InP, AlGaAs, GaAs, InGaAsP, InGaP, InAlAs, and InGaAlAs. By way of a non-limiting example, the substrate may include Si, GaAs and InP.

Figure 2:
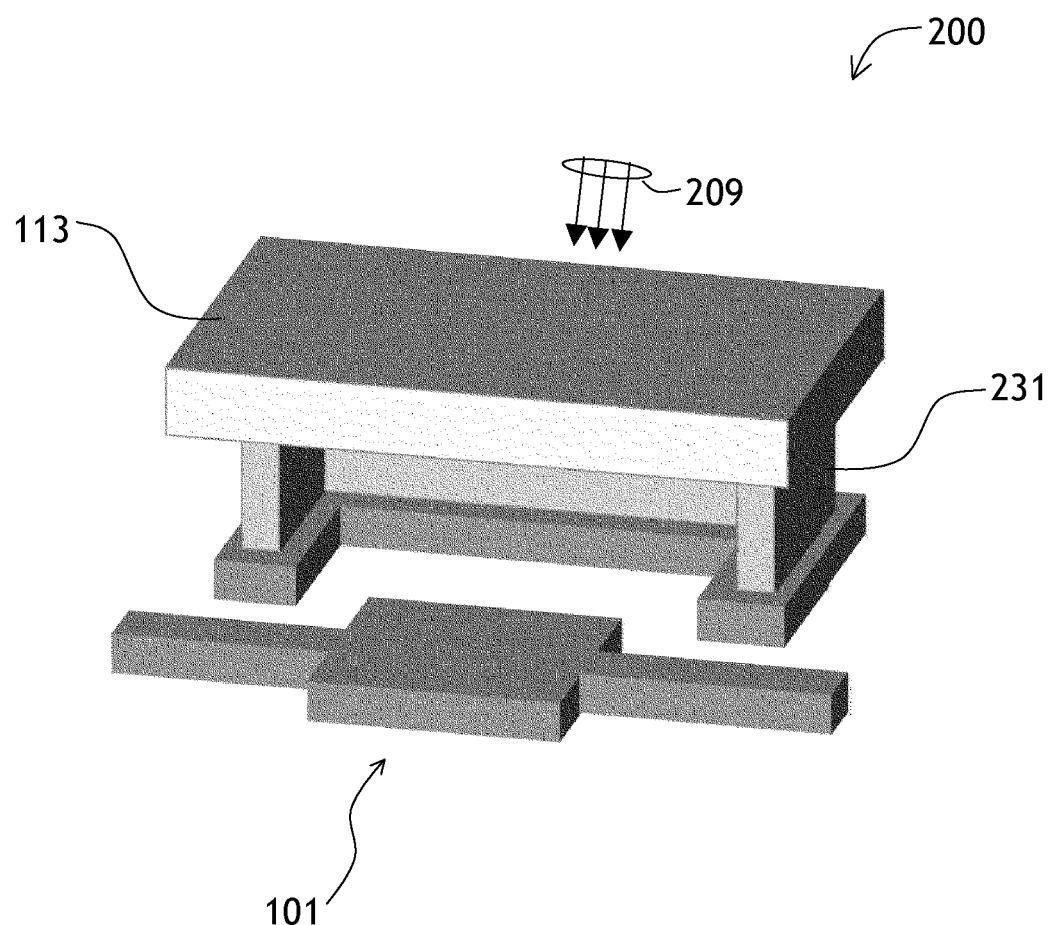
FIG. 2 is a three-dimensional partial cut-out view of a photonic integrated circuit including a metal light shield.

Referring to FIG. 2, a photonic integrated circuit 200 is a variant of the photonic integrated circuit 100 of FIGS. 1A and 1B, and includes similar elements. The photonic integrated circuit 200 of FIG. 2 includes a metal wall 231. The metal wall 231 (only one half is shown in FIG. 2 for clarity) may be disposed on the same layer as the first integrated optical device 101 and may surround the first integrated optical device 101. A metal layer 113 may be disposed on top of the metal wall 231 over the first integrated optical device 101, for extra protection against stray light.

Figure 3:
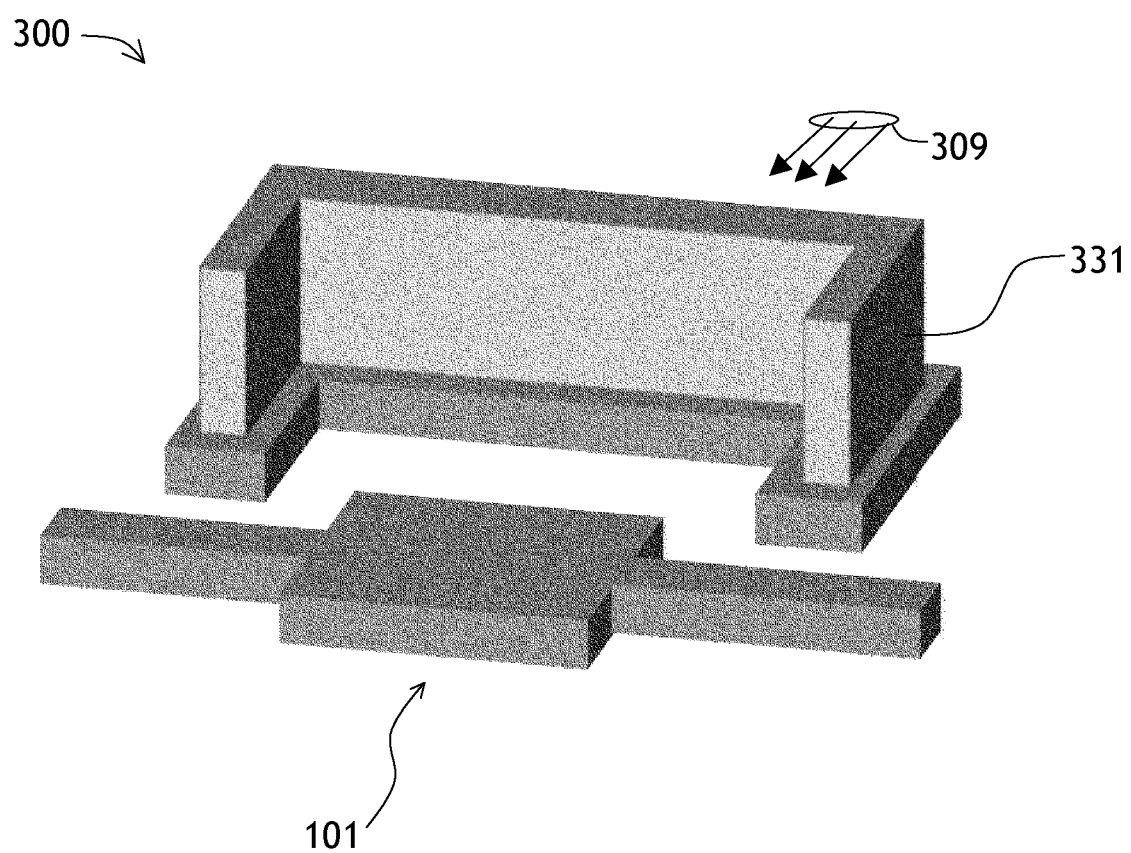
FIG. 3 is a three-dimensional partial cut-out view of a photonic integrated circuit including a semiconductor light shield.

In accordance with one aspect of the present disclosure, an integrated photodetector of a photonic integrated circuit may be optically shielded using an opaque wall structure made of the very material a photosensitive layer of the integrated photodetector is made of, although a doping level may be adjusted for better absorption of light. Referring to FIG. 3, a photonic integrated circuit 300 is a variant of the photonic integrated circuit 100 of FIGS. 1A and 1B, and includes similar elements. The photonic integrated circuit 300 of FIG. 3 includes an optically absorbing wall, e.g. a semiconductor opaque wall 331 surrounding the first integrated optical device 101 and shielding the first integrated optical device 101 from exterior light 309. In one embodiment, the semiconductor opaque wall 331 is made of germanium. In another embodiment, the semiconductor opaque wall 331 is made of silicon doped to a carrier concentration of at least $10^{18}$ cm$^{-3}$. Preferably, the semiconductor opaque wall 331 should have optical transmission of less than 10%, and more preferably less than 5% of the incoming stray light 309.

Figure 4A:
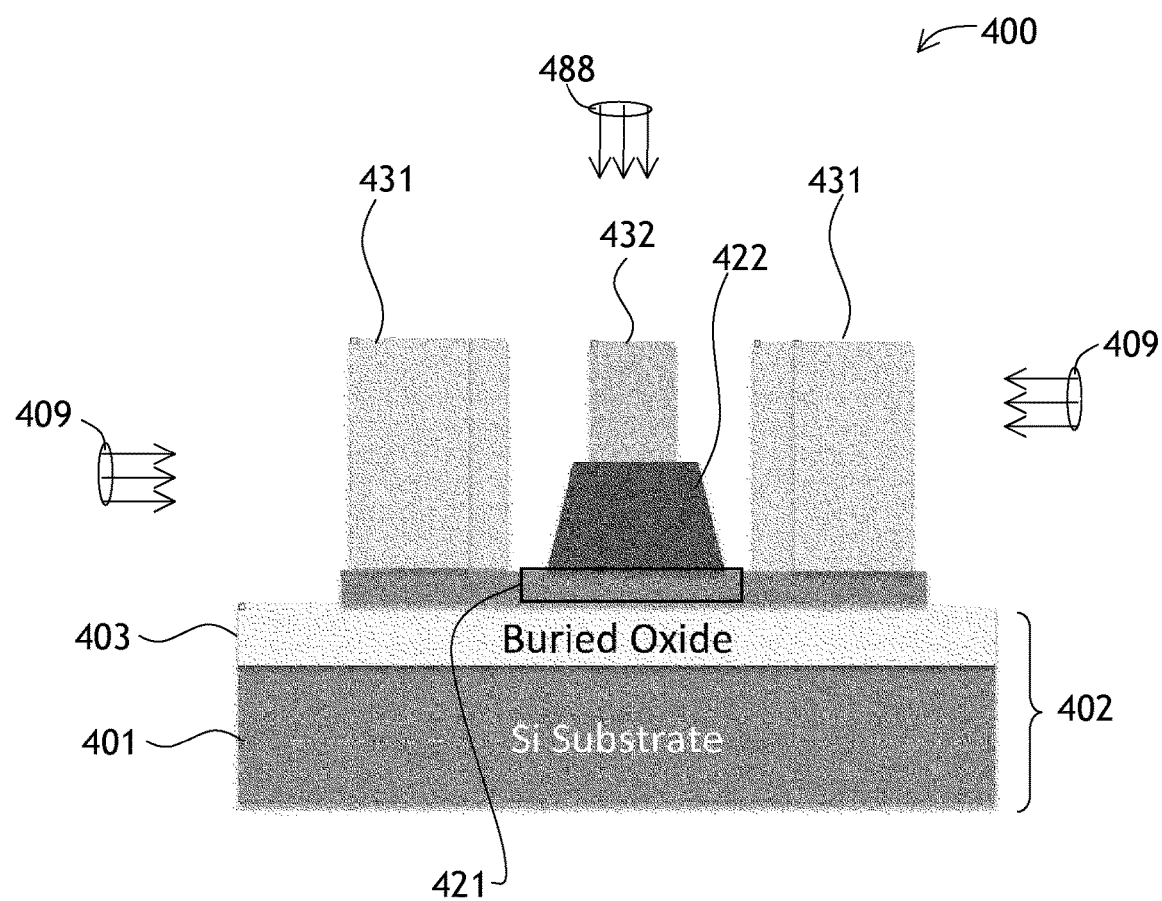
FIG. 4A is a frontal cross-sectional view of a shielded waveguide-coupled photodetector according to the present disclosure, wherein electrodes of the photodetector perform the light shielding function.
Figure 4B:
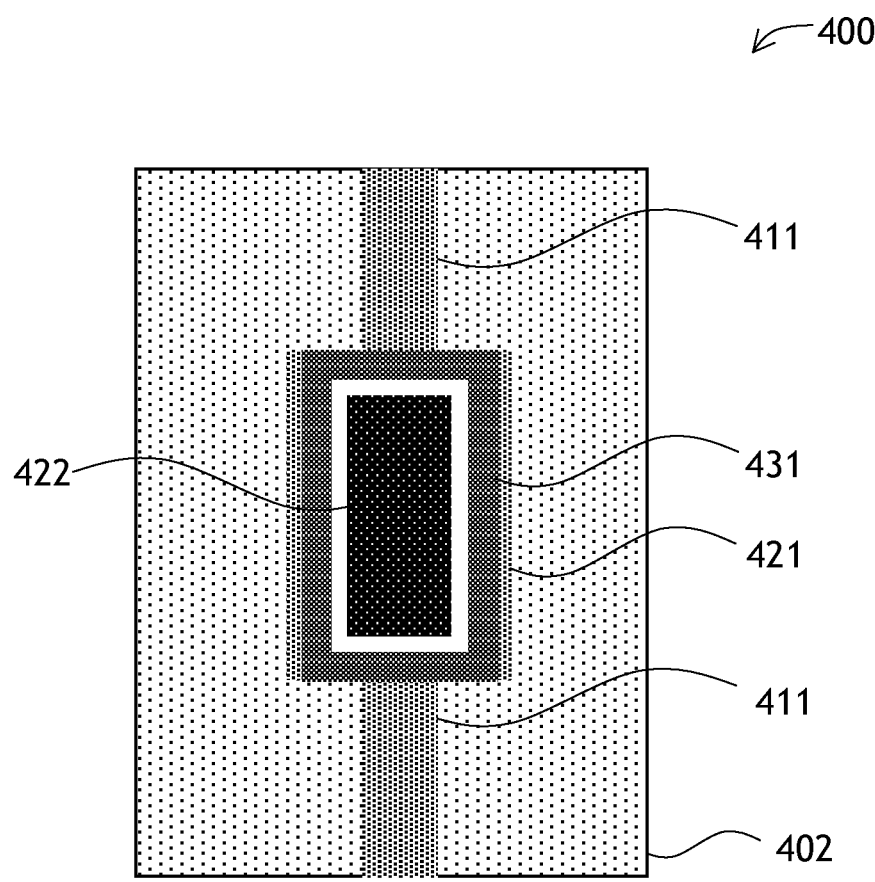
FIG. 4B is a plan view of the shielded waveguide-coupled photodetector of FIG. 4A.

Turning now to FIGS. 4A and 4B, an integrated photodetector 400 of the present disclosure includes an isolating silicon substrate 402 including a buried oxide layer 403 on a silicon underlayer 401, a slab optical waveguide 421, and a photosensitive slab 422 optically coupled to the slab optical waveguide 421. A first electrode 431 may be electrically coupled to the photosensitive slab 422 for conducting a photoelectric signal provided by the photosensitive slab 422 upon illumination with light guided by the slab optical waveguide 421. The first electrode 431 may encircle or surround the photosensitive slab 422 as shown in FIG. 4B, thus functioning as a light shield for absorbing or reflecting stray light 409 propagating towards the photosensitive slab 422. A second electrode 432 may be disposed on top of the photosensitive slab 422, thus shielding the photosensitive slab 422 from ambient light 488.

FIGS. 4A and 4B illustrate but one example of an electrode structure having direct current (DC) or radio frequency (RF) electrodes configured for usage as light shields. More generally, an optical device may be shielded by surrounding light-emitting or light-sensitive portions of the optical device with an electrode structure of the optical device, e.g. photodetector electrodes, modulator electrodes, etc.

Figure 5:
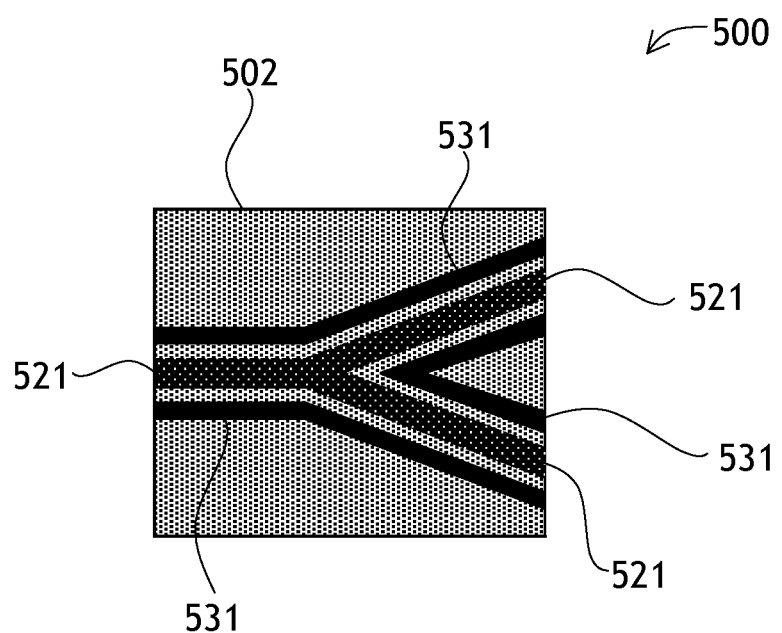
FIG. 5 is a top view of a shielded waveguide Y-junction according to the present disclosure.

Referring to FIG. 5, a photonic integrated circuit 500 is an embodiment of the photonic integrated circuit 100 of FIGS. 1A and 1B, and includes similar elements. The photonic integrated circuit 500 of FIG. 5 includes a substrate 502 and a first opaque wall 531. The photonic integrated circuit 500 further includes a waveguide Y-junction 521 (FIG. 5) as an embodiment of the first integrated optical device 101 (FIG. 1B). The first opaque wall 531 (FIG. 5) of the photonic integrated circuit 500 may surround the waveguide Y-junction 521, e.g. by repeating the shape of the waveguide Y-junction 521 to capture any light coupled into radiative modes.

Figure 6:
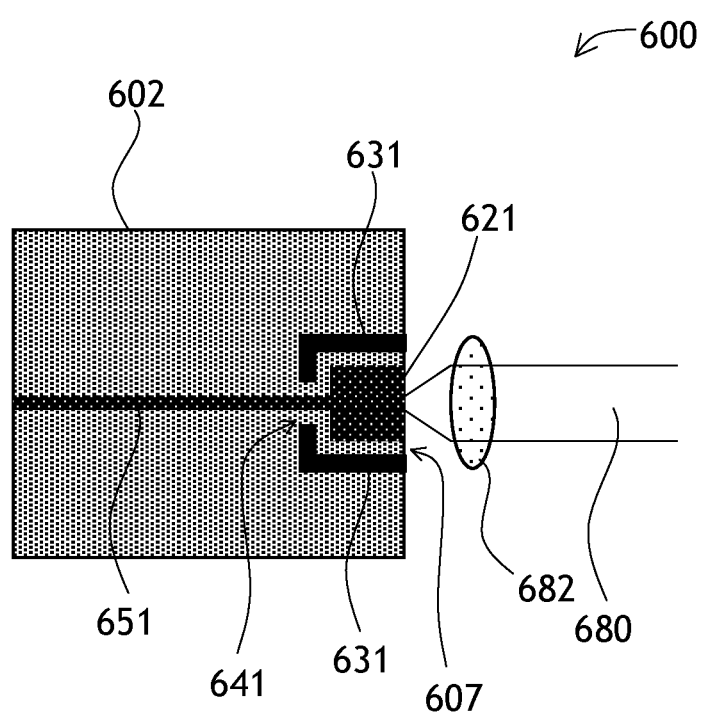
FIG. 6 is a top view of a shielded edge coupler according to the present disclosure.

Turning to FIG. 6, a photonic integrated circuit 600 is another embodiment of the photonic integrated circuit 100 of FIGS. 1A and 1B, and includes similar elements. The photonic integrated circuit 600 of FIG. 6 includes a substrate 602 and a first opaque wall 631. The photonic integrated circuit 600 further includes an edge coupler 621. The edge coupler 621 (FIG. 6) may be disposed proximate an edge 607 of the substrate 602. The first opaque wall 631 partially surrounds the edge coupler 621, leaving the edge 607 available for coupling an optical beam 680 to the edge coupler 621 via an optional external lens 682. A waveguide 651 is coupled to the edge coupler 621. The waveguide 651 extends through an opening 641 in the opaque wall 631 for outputting the coupled optical beam 680.

Figure 7:
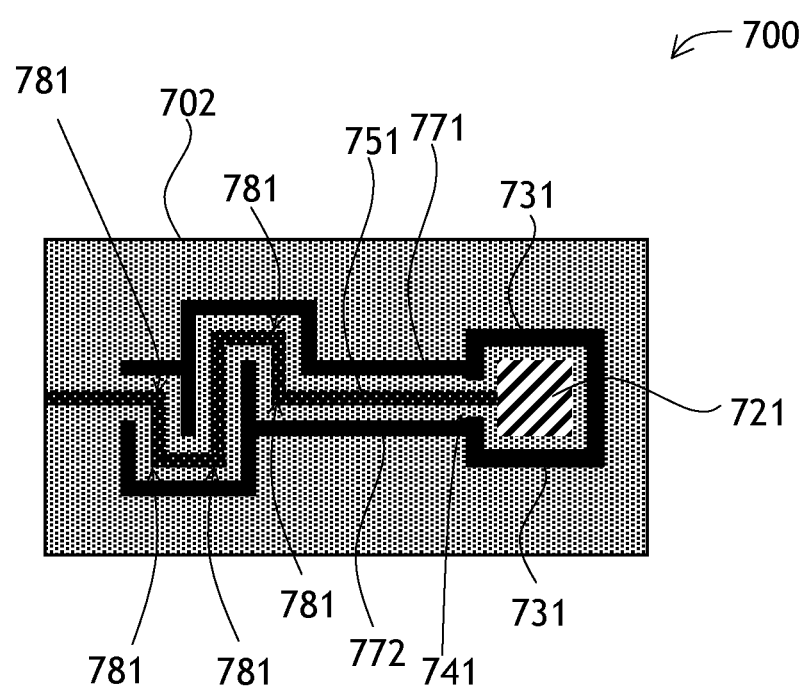
FIG. 7 is a top view of a shielded grating coupler according to the present disclosure, featuring an optional shielded serpentine waveguide.

Referring to FIG. 7, a photonic integrated circuit 700 is yet another embodiment of the photonic integrated circuit 100 of FIGS. 1A and 1B, and includes similar elements. The photonic integrated circuit 700 of FIG. 7 includes a substrate 702 and a first opaque wall 731. The photonic integrated circuit 700 further includes a grating coupler 721 for optically coupling to an external optical fiber or waveguide, not shown. The grating coupler 721 (FIG. 7) corresponds to the first integrated optical device 101 (FIG. 1B). The first opaque wall 731 surrounds the grating coupler 721. The first opaque wall 731 has an opening 741 to pass through a waveguide 751 optically coupled to the grating coupler 721. In the embodiment shown, the waveguide 751 includes serpentine structure including a plurality of alternating turns 781. At least one turn 781 may be provided.

First 771 opaque side walls and second 772 opaque side walls may be provided, as a part of an optical shield structure. The first 771 opaque side walls and second 772 opaque side walls run on both sides of the serpentine structure, so that first 771 opaque side walls and second 772 opaque side walls may absorb or redirect scattered light emitted by the waveguide 751. The first 771 opaque side walls and second 772 opaque side walls may provide better stray light capturing than straight walls. Furthermore, a second opaque wall, not shown, may be disposed on the first opaque wall 731, and/or on the first 771 and second 772 opaque side walls.

Figure 8:
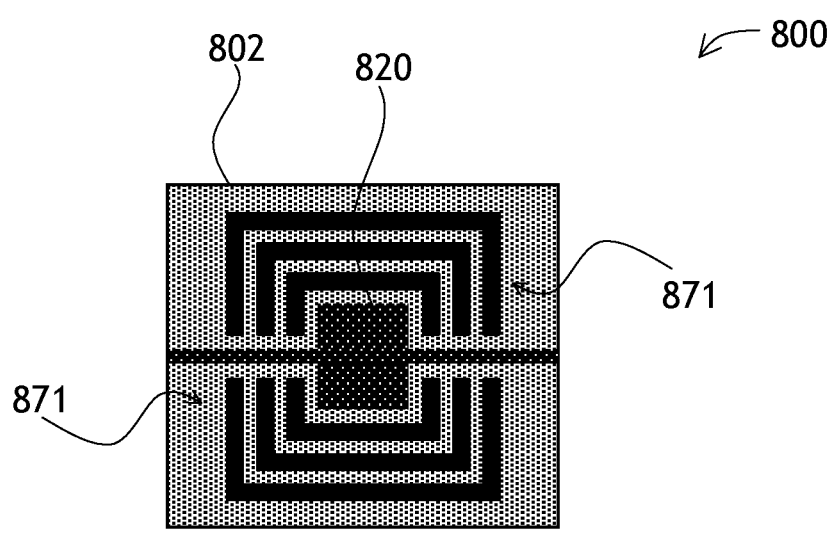
FIG. 8 is a top view of a shielded optical device, the light shielding structure including a Bragg grating structure.

Referring now to FIG. 8, a photonic integrated circuit 800 is yet another embodiment of the photonic integrated circuit 100 of FIGS. 1A and 1B, and includes similar elements. The light shield structure of the photonic integrated circuit 800 of FIG. 8 includes a Bragg structure 871 on a substrate 802. The Bragg structure 871 is configured for out-coupling stray light. The Bragg structure 871 may include a plurality of concentric or parallel walls in the first layer surrounding an integrated optical device 820, as shown.

Figure 9:
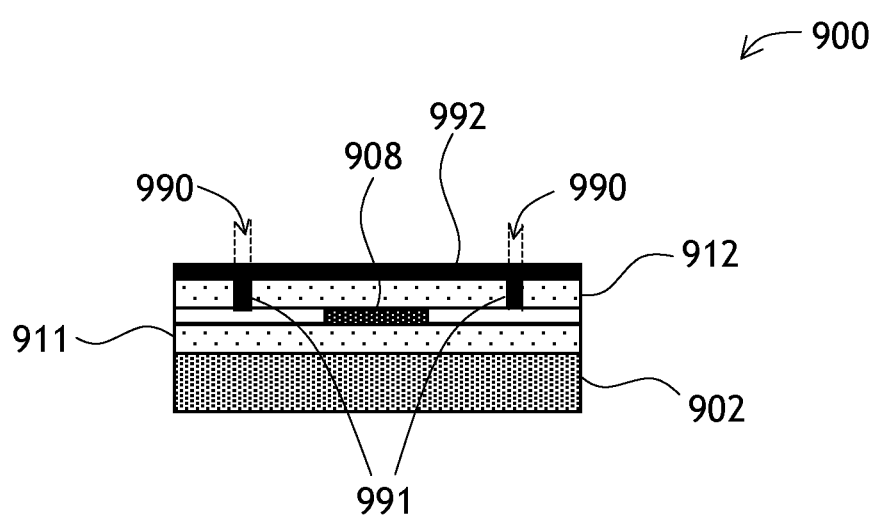
FIG. 9 is a frontal cross-sectional view of a shielded integrated optical device according to another aspect of the present disclosure.

Turning to FIG. 9, a photonic integrated circuit 900 is yet another embodiment of the photonic integrated circuit 100 of FIGS. 1A and 1B, and includes similar elements. The photonic integrated circuit 900 includes a substrate 902, which includes a first dielectric layer 911, such as silicon oxide, for example, on the substrate 902. The photonic integrated circuit 900 further includes of an integrated optical device 908. The integrated optical device 908 is disposed between the first dielectric layer 911 and a second dielectric layer 912. A channel 990 extends through the second dielectric layer 912, surrounding the integrated optical device 908 for absorbing or redirecting stray light. To improve stray light rejection, a metal wall 991 may be formed in the channel 990. The metal wall 991 may extend through the second dielectric layer 912 running around the integrated optical device 908. To further suppress optical crosstalk and reject stray light, a metal overlayer 992 may be disposed over the integrated optical device 908. For better stray light rejection, the metal wall 991 may extend upwards to the metal overlayer 992.

Figure 10:
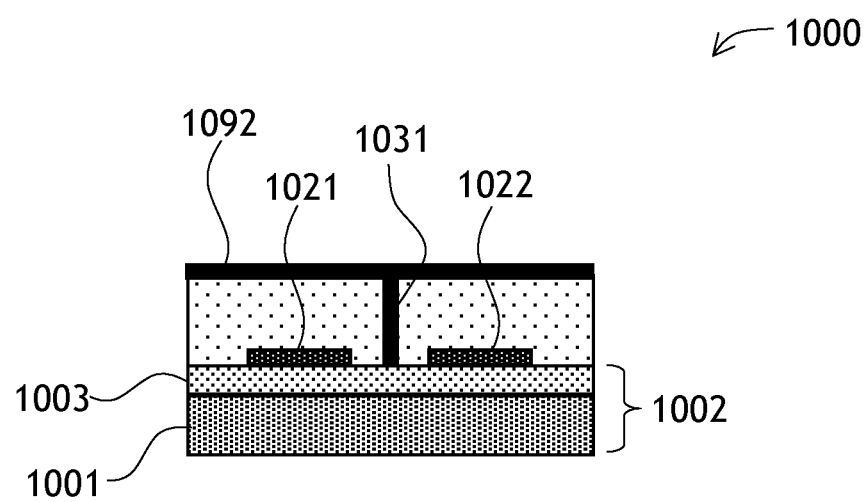
FIG. 10 is a frontal cross-sectional view of a photonic integrated circuit of the disclosure including and an opaque wall extending between the two integrated optical devices for reducing optical crosstalk between them.

Referring now to FIG. 10, a photonic integrated circuit 1000 is a variant of the photonic integrated circuit 100 of FIGS. 1A and 1B, and includes similar elements. The photonic integrated circuit 1000 of FIG. 10 may include a SOI substrate 1002 including a buried oxide layer 1003 on a silicon underlayer 1001, and first 1021 and second 1022 integrated optical devices fabricated on the SOI substrate 1002. An opaque wall 1031 extends between the first 1021 second 1022 integrated optical devices for suppressing optical crosstalk between the first 1021 and second 1022 integrated optical devices. Similar to the photonic integrated circuit 900 of FIG. 9, the photonic integrated circuit 1000 of FIG. 10, may include a metal overlayer 1092 over the integrated optical device 1021 and 1022. For better stray light rejection, the opaque wall 1031 may extend from the substrate 1002 to the metal overlayer 1092.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A photonic integrated circuit comprising:
   a substrate;
   a dielectric layer;
   a semiconductor layer including a first integrated optical device comprising a first slab waveguide and at least one input/output waveguide between the dielectric layer and the substrate; and
   an optically-absorbing, light-shield structure surrounding the first slab waveguide, except for at least one opening for the at least one input/output waveguide, capable of shielding the first slab waveguide from stray light;
   wherein the optically-absorbing, light-shield structure comprises a first wall in the dielectric layer, which does not extend down to the substrate, whereby the optically-absorbing, light-shield structure and the substrate suppress optical crosstalk between the first integrated optical device and other optical devices.

2. The photonic integrated circuit according to claim 1, wherein the first slab waveguide comprises a photosensitive slab capable of receiving light from the input/output waveguide.

3. The photonic integrated circuit according to claim 2, wherein the optically-absorbing, light-shield structure and the photosensitive slab are comprised of the same optically absorbing material.

4. The photonic integrated circuit according to claim 3, wherein the optically absorbing material comprises germanium.

5. The photonic integrated circuit according to claim 1, wherein the optically-absorbing, light-shield structure comprises germanium.

6. The photonic integrated circuit according to claim 1, wherein the optically-absorbing, light-shield structure comprises silicon doped to a carrier concentration of at least $10^{18}$ cm$^{-3}$.

7. The photonic integrated circuit according to claim 1, wherein the optically-absorbing, light-shield structure comprises a material with an optical transmission of less than 10%.

8. The photonic integrated circuit according to claim 1, further comprises a second integrated optical device over the substrate adjacent to the first integrated optical device with the optically-absorbing, light-shield structure therebetween.

9. The photonic integrated circuit according to claim 8, wherein the second integrated optical device comprises a light emitting device.

10. The photonic integrated circuit according to claim 1, further comprising a metal shield layer mounted on the optically-absorbing, light-shield structure over the first slab waveguide for shielding the first integrated optical device from stray light.

11. The photonic integrated circuit according to claim 1, further comprising a semiconductor shield layer mounted on the optically-absorbing, light-shield structure over the first slab waveguide for shielding the first integrated optical device from stray light.

12. The photonic integrated circuit according to claim 1, wherein the optically-absorbing, light-shield structure also comprises a second wall surrounding the integrated optical device on top of the dielectric layer comprising at least partially reflecting and/or scattering material.

13. The photonic integrated circuit according to claim 12, wherein the second wall comprises photonic crystal or a plasmonic structure.

14. The photonic integrated circuit according to claim 12, wherein the second wall extends from the first wall, and does not extend down to the semiconductor layer.

15. The photonic integrated circuit according to claim 14, wherein the optically-absorbing, light-shield structure further comprises a metal shield layer mounted on the second wall over the first slab waveguide for shielding the first integrated optical device from stray light.

16. The photonic integrated circuit according to claim 14, further comprising a semiconductor shield layer mounted on the optically-absorbing, light-shield structure over the first slab waveguide for shielding the first integrated optical device from stray light.

17. The photonic integrated circuit according to claim 1, wherein a first input/output waveguide of the at least one input/output waveguides includes a serpentine structure; and
   wherein the optically-absorbing, light-shield structure includes serpentine side walls extending on both sides of the serpentine structure.

* * * * *